July 12, 1927.
K. B. RUBINS
1,635,560
THREE-WHEEL RIDING CULTIVATOR
Filed April 29, 1925   2 Sheets-Sheet 2
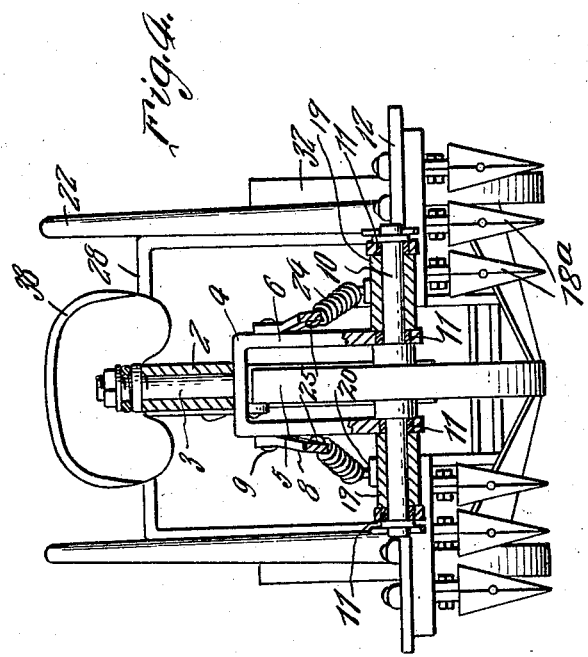
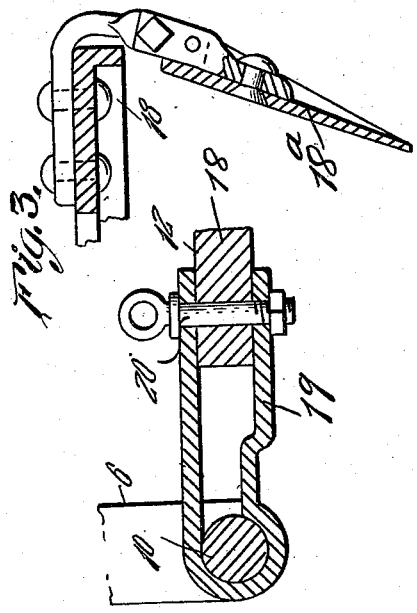
Inventor
K. B. Rubins
By
Attorney Patented July 12, 1927.

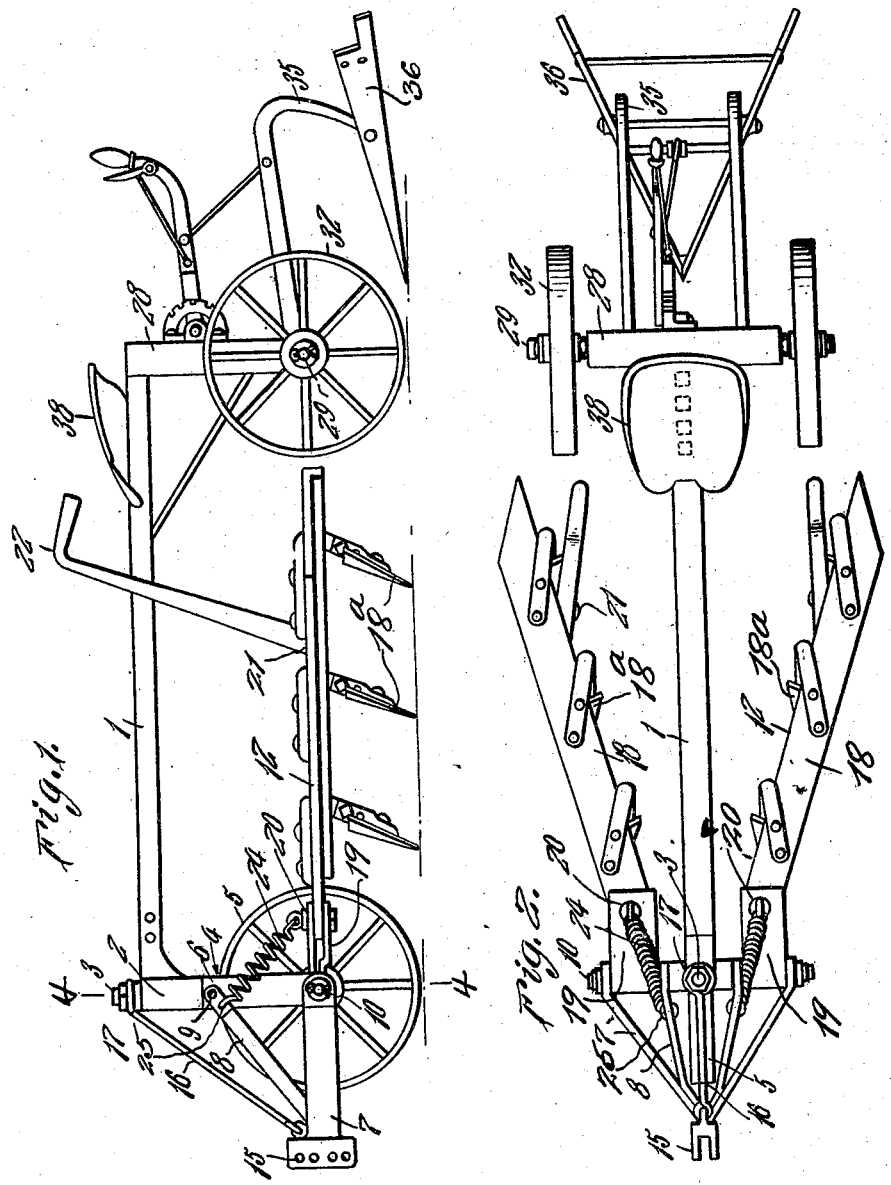

1,635,560

UNITED STATES PATENT OFFICE.

KAY B. RUBINS, OF MORRAL, OHIO.

THREE-WHEEL RIDING CULTIVATOR.

Application filed April 29, 1925. Serial No. 26,712.

The purpose of the present invention is to provide a three-wheel riding cultivator designed to operate between the rows of corn or other crop to be cultivated, the shovel carrying beams being yieldingly supported to ride over and agitate the soil and movable laterally so that the shovels will operate in different positions for the purpose of facilitating the cultivation of the crops.

Another purpose is to provide, in a cultivator of this type, a construction wherein angularly disposed plows are supported in the rear of the shovels of the adjustable beams for the purpose of turning the soil toward the crops, thereby facilitating their cultivation.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in side elevation of the improved three-wheel cultivator constructed in accordance with the invention.

Figure 2 is a plan view of the same.

Figure 3 is a sectional view of the section 18 and one of the shovels carried thereby.

Figure 4 is a sectional view on line 4—4 of Figure 1.

Figure 5 is a sectional view through the part 6, axle 10, one of the beams 12 and the clips 23, which connect the beam to the axle.

Referring to the drawings, 1 designates the frame of the cultivator which is designed to operate between the rows of corn or other crop to be cultivated. The forward portion of the frame has a cylindrical bearing 2 which receives an upstanding pin or shank 3 of the forward frame 4. This forward frame 4 straddles the front supporting wheel 5. The forward frame consists of the U-shaped upright portion 6 and the forward V-shaped portion 7, the latter extending at right angles to the former, there being braces 8 bolted at 9 to the upright and forwardly extending portions to reinforce the structure.

A suitable axle 10 passes through the adjacent ends of the vertical and forwardly extending portions of the front frame, said adjacent ends of said portions having babbitt lined bearings 11 for the axle to permit the axle to freely rotate, it being possible for the front wheel 5 to rotate on or with the axle, preferably in the latter manner. The axle extends a substantial distance from the opposite sides of the adjacent ends of the forward and vertical portions of the front frame to make provision for the support of the shovel carrying beams 12.

It will be noted that the forward part of the front brace and the forward portion of the front frame are closely positioned and carried thereby in any suitable manner is a draft clevis 15 to which a draft rig (not shown) may be connected. The draft rig may have adjustable connections to the clevis to accommodate the rig to the cultivator and vice versa. A rod 16 connects where the clevis is connected to the brace of the front frame while the other end of the rod is passed up toward and terminates in an eye 17 to receive the upper extremity of the pivot pin between the front frame and the main frame, thereby permitting freedom of movement of the parts.

The shovel carrying beams 12 each comprises two sections 18 and 19, the latter section being pivotally mounted upon the extended parts of the front axle between the adjacent ends of the forward and upright portions of the front frame and the ends of the brace. The sections of these beams are pivotally united at 20 and the sections 18 are of cross-sectionally angular form and are disposed in diverging positions, shovels 18ª being carried by them. The forward shovels are relatively close together, the next set of shovels further apart, and the last pair of shovels thereof may be positioned a greater distance apart than the formerly mentioned shovels.

Rising from and secured at 21 to the sections 18 of said beams are handles 22 by which the sections 18 may be moved pivotally. Fastened to the pivots 20 are certain of the ends of springs 24 which are, in turn, connected at 25 to the braces 8. It is obvious that the beams are yieldingly supported and when raised or lowered, the tension of the springs assists their action, that is, in being raised, hence facilitating in the cultivation of the crops due to agitating the soil between the rows.

At the rear end the main frame is provided with a depending yoke frame 28 supporting the rear axle 29 which carries the rear wheels 32, shanks 35 extending rearwardly from the axle 29 and carrying the plows 36.

An operating seat 38 is positioned on the main frame 1 to place the operator in convenient position for grasping the handles 22.

The invention having been set forth, what is claimed is:

A cultivator comprising main and forward frames of which the latter is pivotally connected with the former, a supporting wheel rotatably mounted in the forward frame, an axle extending through the supporting wheel and protruding laterally therefrom on opposite sides, shovel-carrying beams comprising two sections of which the forward section is pivotally connected with said axle for swinging movement in a vertical plane and the rear section pivotally connected to the forward section for swinging movement in a horizontal plane, eye bolts constituting said pivotal connections between the beam sections, springs tensioned between the forward frame and the eyes of the eye bolts, and handle members carried by the rear sections of the shovel-carrying beams.

In testimony whereof he affixes his signature.

KAY B. RUBINS.